(12) United States Patent
Turner et al.

(10) Patent No.: US 7,349,177 B2
(45) Date of Patent: Mar. 25, 2008

(54) CARTRIDGE LOADING DEVICES

(75) Inventors: Philip Turner, Bristol (GB); Mark Dillon, Bristol (GB); Andrew Mark Fernihough, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 294 days.

(21) Appl. No.: 11/251,387

(22) Filed: Oct. 14, 2005

(65) Prior Publication Data

US 2006/0092554 A1 May 4, 2006

(30) Foreign Application Priority Data

Oct. 28, 2004 (GB) ................................ 0424026.3

(51) Int. Cl.
*G11B 5/008* (2006.01)
*G11B 15/00* (2006.01)
(52) U.S. Cl. ........................................ 360/94; 360/96.5
(58) Field of Classification Search ................. 360/94, 360/96.5
See application file for complete search history.

(56) References Cited

U.S. PATENT DOCUMENTS 4,603,362 A 7/1986 Sendelweck
5,558,291 A * 9/1996 Anderson et al. ........... 242/336
5,793,565 A * 8/1998 Suzuki ........................ 360/94
5,822,149 A * 10/1998 Takase et al. ................ 360/94
5,923,497 A * 7/1999 Suzuki ..................... 360/96.5
2007/0091502 A1 * 4/2007 Murase et al. ................ 360/85

* cited by examiner

Primary Examiner—William J. Klimowicz (57) ABSTRACT

A cartridge loading device 10 for magnetic tape cartridges includes a first member 12, a second member 14 movable relative to the first member from a first position to a second position and a guide arrangement for guiding movement of the second member between its first and second positions. The guide arrangement includes a projection 38 received in an elongate guide track 32 defining a line of movement having a first end that defines the first position of the second member 14 and a second end that defines its second position. The cartridge loading device also has a locking system that includes a pivotable locking member 82 engageable with the projection 38 for locking the second member in its first position. The cartridge loading device can receive two different sizes of cartridge that correspond to the two positions of the second member. The locking member is actuable by insertion of a cartridge having the larger of two sizes into the device to release the projection to permit movement of the second member from the first position to the second position. The pivotable locking member 82 has a pivot point 92 disposed on a line that is in line with at least a first portion of the line of movement. The first portion extends from the first end of the line of movement.

18 Claims, 3 Drawing Sheets

CARTRIDGE LOADING DEVICES

FIELD OF THE INVENTION

The invention relates to cartridge loading devices for magnetic tape cartridges used for storage of digital data.

BACKGROUND TO THE INVENTION

Magnetic tape is commonly used for storage of digital data. The magnetic tape is spooled on reels in a cartridge that is insertable into a digital data transfer apparatus in which data can be written onto the tape and/or data can be read from the tape. Such data transfer apparatus, which may be referred to as a tape drives, typically includes a tape head for one or both of reading and/or writing data from or to the tape head.

Known tape drives are generally designed to use a predetermined size tape cartridge that contains tape having a known width. Known cartridge loading devices of tape drives are generally designed to be used with a particular size of cartridge. Such devices conventionally include means for ensuring that only cartridges of the correct size can be inserted and then only when the cartridge is correctly oriented. A feature of known cartridge loading devices is that they are made rigid so that cartridges of the wrong size or incorrectly oriented cartridges cannot be forced into the tape drive, except by the exertion of an unnatural amount of force.

One format for data storage in a helical scan tape drive is Digital Data Storage (DDS). Various versions of DDS exist, but each version uses the same width tape in Digital Audio (DAT) cartridges, including DAT72 and DAT160. The tape width is approximately 4 mm. There is a demand for more and more data storage capacity. This has, to some extent, been met by improved reading and writing techniques that have allowed increased amounts of data to be stored, without changing the tape length or width. However, ultimately, the storage capacity of a given size of tape has a limit.

One solution to the problem of data storage capacity is to increase the width of the tape. Of course, a greater width provides more storage capacity. However, since the cartridge loading devices of tape drives are designed to accept a particular size cartridge, if wider tapes are used, tape drives with loading devices able to accept a larger cartridge must be provided. This then provides the user with the problem that legacy format tape cartridges would not be usable with the new tape drive and so it would be necessary to maintain more than one tape drive or transfer existing stored data to the wider tape.

Conventional cartridge loading devices that can only accept a single size of cartridge are designed in such a way that cartridges can only be inserted when correctly oriented. To this end, conventional cartridge loading devices are of rigid construction and equipped with means, such as ramps or ribs, that interact with formations on the cartridge to prevent insertion in any but the correct orientation. The result is that an incorrectly oriented cartridge can only be inserted by using an unnaturally large force, usually such as would result in damage to the device and/or cartridge.

The applicant is proposing a new cartridge loading device that can expand in such a way that it can accept different sized cartridges. By this means, a single device can be used with tapes having different widths. In such a cartridge loading device, it remains desirable to have means for preventing the insertion of incorrectly oriented cartridges. However, the conventional means rely on the rigidity of the cartridge loading device.

Figure 1:
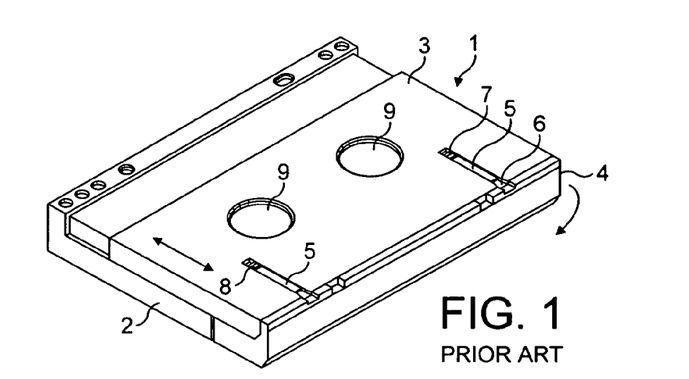
FIG. 1 is a perspective view of the underside of a conventional DAT cartridge.

FIG. 1 shows the underside of a conventional DAT cartridge 1. The cartridge 1 is generally rectangular and comprises a two-piece body 2, a slider 3 mounted on the lower half of the body and a lid 4 hinged to the front side of the upper half of the body. The slider 3 has two grooves 5 formed in its side that faces away from the body 2. Each groove has two apertures 6, 7 formed in its base. The apertures 6 are at the front end of the respective grooves and the apertures 7 are at the rear end. The lower half of the body 2 is provided with two detents 8, one for each groove 5. In the position of the slider 3 illustrated in FIG. 1, the detents 8 are engaged in the rear end apertures 7. The cartridge contains a supply hub and a take up hub (not shown) around which the tape is spooled and the lower half of the body has respective spindle apertures (not shown) to permit spindles of a spindle drive to engage the hubs. The slider 3 also defines two apertures 9 and can be slid to a position in which the apertures 9 overlie the spindle apertures to permit access to the hubs.

In order to access the tape contained within the cartridge, it is necessary for the slider 3 to be slid away from the front side of the cartridge 1 toward the rear. This brings the apertures 9 into line with the spindle apertures so that the spindle drive can be raised to engage with the hubs. Rearward movement of the slider 3 also provides access to the lid 4, which is pivotted clockwise (as viewed in the drawing) to allow the tape to be drawn forward from the cartridge to bring it into contact with the tape head.

Figure 2:
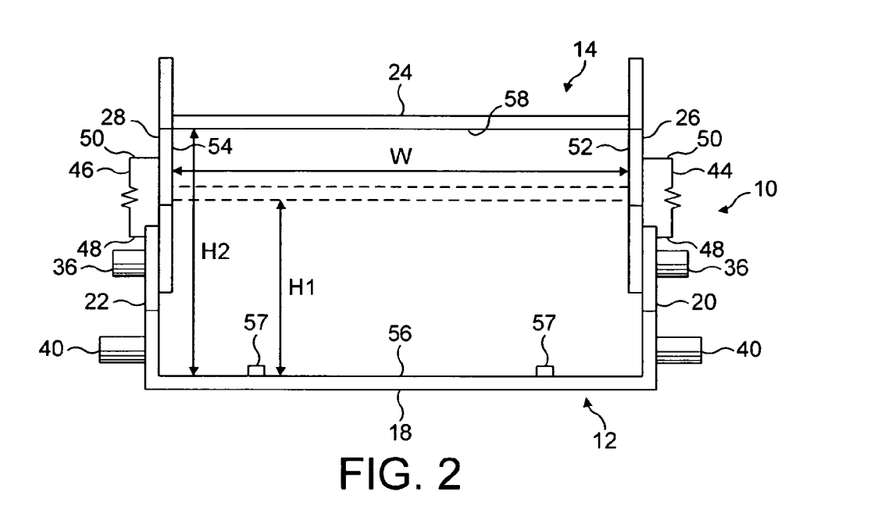
FIG. 2 is a is a front elevation of a cartridge loading device in one condition.

In order to cause the slider 3 to slide to the rear of cartridge body 2, tape drives are conventionally provided with small ribs (for example, see the ribs 57 on the floor 56 of the cartridge loading device 10 shown in FIG. 2). As the cartridge is slid into the cartridge loading device, the ribs 57 enter the respective grooves 5 at their front ends. As the cartridge 1 is inserted further into the cartridge loading device, the grooves 5 slide over the ribs 57 until the ribs engage and press the detents 8 down and out of the rear end apertures 7. This releases the slider 3 and continued insertion of the cartridge results in the slider being pushed rearwardly on the body 2. When the cartridge is fully inserted, the ribs are clear of the front end of the grooves allowing the detents 8 to penetrate the front end apertures 6 and so lock the slider in place. Once the slider is pushed back, the lid can be raised and the tape drawn forwardly from the cartridge by a tape guide assembly (not shown). When the cartridge is withdrawn from the cartridge loading device, the ribs 57 push the detents 8 out of the front end apertures 6 allowing the slider 3 to be slid toward the front side of the cartridge by a spring until the detents 8 engage in the rear end apertures 7.

It is important that the ribs 57 should properly engage in the grooves 5 and move the slider 3 to its rearward position. Without this, the lid 4 cannot open and the spindle drive will punch a hole through the underside of the cartridge, rather than passing through the apertures 9 and into engagement with the hubs.

The grooves 5 and ribs 57 are relatively small features. The grooves have a standard width of around 3 mm and a depth of 0.65 mm±0.05 mm. Therefore, in order for the ribs 57 to function, the tolerances in production of the cartridge loading device 10 and the cartridge must be kept tight. For example, if the height of the opening in the cartridge loading device 10 into which the cartridge is inserted is just a little too large, the cartridge could simply "float" over the ribs 57, which would then not penetrate sufficiently deeply to release the detents and slide the slider to the rear of the cartridge.

In conventional cartridge loading devices having a one size opening, the construction is rigid and it is possible to manufacture to tolerances that should ensure the ribs 57 function every time a cartridge is inserted into the cartridge loading device. In an expandable cartridge loading device as proposed by the applicant, this is more problematical, since there will be parts that move relative to each other in order to provide the expansion and this makes it more difficult to manufacture to tight tolerances.

SUMMARY OF THE INVENTION

The invention provides a cartridge loading device for magnetic tapes comprising housing means defining a housing for magnetic tape cartridges that can expand from a first size to a second size, guide means for controlling expansion of said housing from said first size to said second size and comprising at least one means defining a line of movement having a first end associated with said first size of said housing and a second end associated with said second size of housing, and a rotatable locking means for locking said housing means in a locked condition in which said housing is said first size, said first size having a first height and said second size having a second height, said second height being greater than said first height, said sizes of said housing being selected such that when said housing is said first size, it can receive first sized magnetic tape cartridges having a predetermined height and when said housing is said second size, it can receive second sized magnetic tape cartridges having a predetermined height that is greater than the height of said first sized magnetic tape cartridges, and said locking means being actuable by insertion of a second sized cartridge into said housing to release said housing means from said locked condition to permit expansion of said housing from said first size to said second size and having an axis of rotation located on a line that is in line with at least a first portion of a line of movement defined by said at least one means defining a line of movement, which first portion extends from said first end of the line of movement.

The invention provides a cartridge loading device for magnetic tape cartridges, said device comprising a first member, a second member movable relative to said first member from a first position to a second position, a guide arrangement for guiding movement of said second member between said first and second positions and comprising a projection received in an elongate guide track defining a line of movement for said projection having a first end defining said first position and a second end defining said second position, and a locking system comprising a pivotable locking member engageable with said projection for locking said second member in said first position, said first and second members cooperating when in said first position to define a first sized opening having a height sized to receive first sized magnetic tape cartridges having a predetermined height and, when in said second position, cooperating to define a second sized opening having a height that is greater than the height of said first sized opening, said second sized opening being sized to receive second sized magnetic tape cartridges having a predetermined height that is greater than the height of said first sized magnetic tape cartridges, said locking member being actuable by insertion of a second sized cartridge into said first sized opening to release said projection to permit movement of said second member from said first position to said second position, and said pivotable locking member having a pivot point disposed on a line that is in line with at least a first portion of said line of movement, which first portion extends from said first end.

BRIEF DESCRIPTION OF THE DRAWINGS

In order that the invention may be well understood, an embodiment thereof, which is given by way of example only, will now be described with reference to the drawings, in which.

DETAILED DESCRIPTION

Referring to FIG. 2, a cartridge loading device 10 for magnetic tape cartridges used for storage of digital data comprises a first member 12 and a second member 14. Each member 12, 14 comprises a generally U-shaped channel and the two channels are oppositely disposed so as to define a housing for magnetic tape cartridges that has a substantially rectangular opening 16.

The U-shaped channel of the first member 12 comprises a horizontally disposed base or floor portion 18 and opposed upstanding limbs 20, 22 that extend perpendicular to the base portion 18. The U-shaped channel of the second member 14 comprises a horizontally disposed upper or roof portion 24 and opposed depending limbs 26, 28 that extend perpendicular to the roof portion and parallel to the limbs 20, 22 of the first member 12. The arrangement is such that the limbs 26, 28 of the second member are disposed inside of, and adjacent and parallel to, the respective limbs 20, 22 of the first member 12.

The limbs 20, 22 of the first member 12 are each provided with guide tracks in the form of two elongate slots 30, 32 that are upwardly inclined towards the rear 34 of the cartridge loading device 10. The limbs 26, 28 of the second member 14 are each provided with outwardly projecting pins 36, 38 that project through the respective slots 30, 32 and can slide back and forth in the slots, which define respective straight movement lines for the pins. The slots 30, 32 and pins 36, 38 constitute a guide arrangement that guides movement of the second member 14 relative to the first member 12.

The limbs 20, 22 of the first member 12 are fitted with a set of outwardly projecting pins 40, 42 by which the cartridge loading device 10 is located in a digital data transfer apparatus, or tape drive (not shown).

Figure 3:
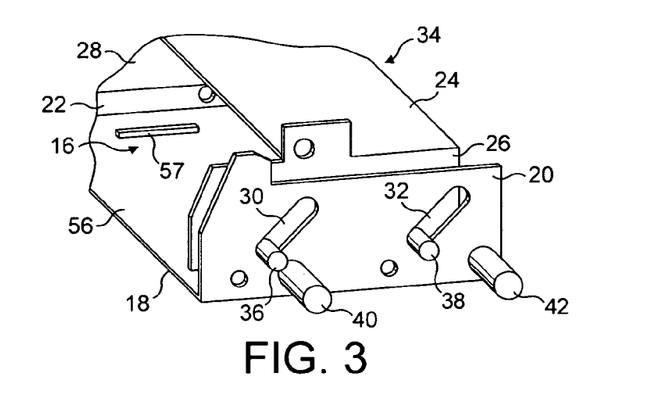
FIG. 3 is a perspective view of the cartridge loading device of FIG. 2 in another condition.

The first and second members 12, 14 are held together in the condition shown in FIG. 3 by a spring biasing arrangement. By way of example, tension springs 44, 46 are shown connected at their ends to respective pins 48, 50 provided on the limbs of the first and second members 12, 14. It is to be understood that the arrangement of springs and pins shown in FIG. 2 is purely schematic. The springs and pins have been omitted from FIGS. 3 and 4 for the sake of clarity. As another alternative, springs might be attached to one or more of the pins 36, 38 and respective attachment portions, such as lugs, on the first member 12. It is also to be understood that other forms of spring biassing can be used and that the biassing of the two members 12, 14 can be achieved by means other than springs.

The normal condition of the cartridge loading device is as shown in FIG. 3. In this condition, the second member 14 is pulled down towards the first member 12 so that the pins 36, 38 are at the lower ends of the respective slots 30, 32. In this condition, and referring to FIG. 2, the opening 16 has a size determined by the distance W between the inner surfaces 52, 54 of the limbs 26, 28 of the second member 14 and the distance H1 between the inner surface 56 of the floor 18 and the inner surface 58 of the roof 24, which for the FIG. 3 condition is shown by dashed lines in FIG. 2. The first sized opening 16 thus described is a relatively narrow opening for cartridges containing a relatively narrow width tape. Typically, the first sized opening might be for a 4 mm tape cartridge.

Figure 4:
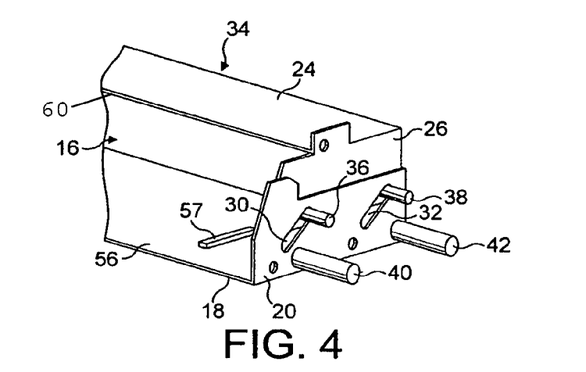
FIG. 4 is a perspective view of the cartridge loading device in the same condition as in FIG. 2.

By virtue of the permitted movement of the second member 14 relative to the first member 12, the size of the opening 16 can be increased to accept a larger cartridge. Typically, the larger cartridge might be an 8 mm tape cartridge. When a larger cartridge is inserted into the opening 16 with the cartridge loading device 10 in the condition shown in FIG. 2, the force applied to the second member 14 pushes the second member upwardly and towards the rear 34 of the device. The movement of the second member relative to the first member is guided by the pins 36, 38 sliding in the slots 30, 32. The guide arrangement is configured such that with the pins 36, 38 at the upper ends of the slots 30, 32 (as shown in FIG. 4), the size of the opening 16 is increased to a second size, just large enough to receive the larger size cartridge. The second size opening has a width W equal to that of the first size opening. However, the height of the opening is increased to H2. The second size opening is thus able to accommodate a larger size cartridge, such as an 8 mm tape cartridge, having a relatively wider tape than the cartridge that can be received in the first size opening.

In the illustrated embodiment, the slots 30, 32 are inclined at an angle of 45° to the horizontal, i.e. to the floor 18. It will be appreciated that the angle of inclination can be varied. However, 45° is preferred, since if the angle is steeper, the force required to move the second member from the position shown in FIG. 3 to the position shown in FIG. 4 is increased, while if the angle of inclination is made less steep, the movement of the second member is made too long.

When a larger size cartridge is removed from the opening 16 of the cartridge loading device 10, the springs 44, 46 pull the second member 14 down towards the floor 18 of the first member. The springs are selected to have sufficient spring force to reliably return the device to the FIG. 3 condition. It will be appreciated that the springs should not be overly stiff, as this would increase the force required to move the second member 14 away from the first member 12 to permit insertion of the larger size cartridge and produce an unnecessarily harsh closing action.

The first and second members 12, 14 are preferably made from a metal, such as steel. Steel components are preferably treated to prevent corrosion.

In order to facilitate the upward movement of the second member 14 relative to the first member 12, it may be desirable to provide an inclined, or ramp-like, lead-in to the opening 16. By way of an example, the leading edge 60 (FIG. 4) of the roof 24 of the second member could be provided with a plastics member, or members, that provide an inclined lead-in to the opening 16. The plastics member (s) might, for example, comprise a body comprising a groove for fitting to the leading edge 60 (preferably the groove would be sized to be a push-fit) with a ramp-like front surface opposite to the side provided with the groove. The inclination of the ramp-like surface would be down towards the floor 18 of the first member and towards the rear of the cartridge loading device 10.

It will be understood that although the embodiment has two members 12, 14 arranged such that the upper of the two moves upwardly with respect to the lower, it is equally possible to have an arrangement in which the lower member moves downwardly with respect to the upper member.

The cartridge loading device 10 is provided with a locking system to assist in preventing the insertion of cartridges that are not correctly oriented by controlling relative movement between the first member 12 and the second member 14. The locking system will now be described with reference to FIGS. 5 to 8.

Figure 5:
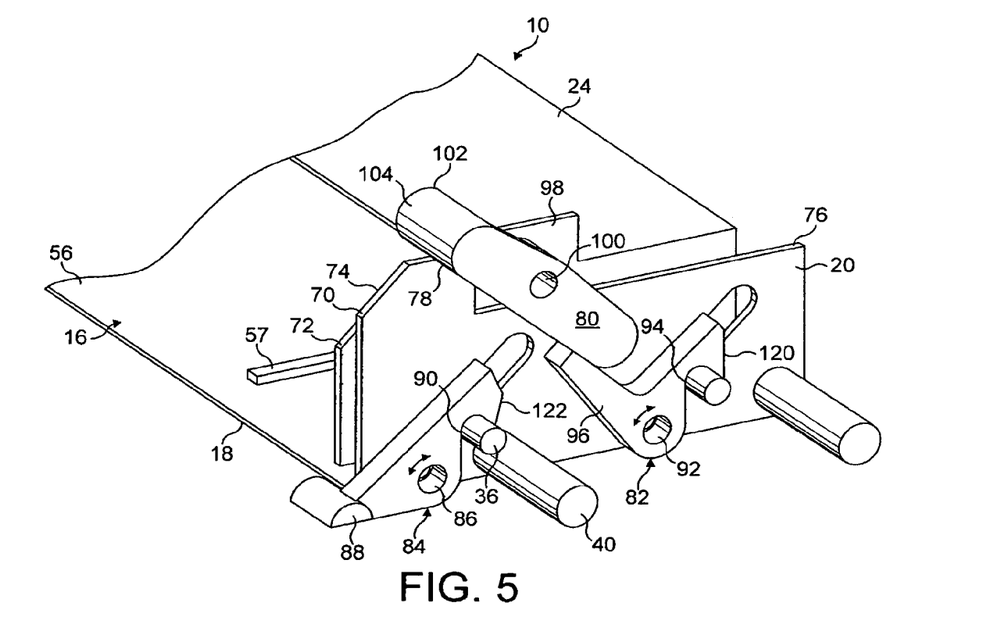
FIG. 5 is a perspective view, corresponding generally to FIG. 3, showing an locking system for the cartridge loading device.

Referring to FIG. 5, the limb 20 of the first member 12 has a bevelled leading edge 70. The limb 26 of the second member 14 has a similar bevel 72. The limbs 22 and 28 have corresponding bevels (not shown). The limb 20 additionally includes a projection, or ear, 74 projecting upwardly of the upper edge 76 of the limb. The rearward side of the ear 74 defines an inclined stop surface 78 that acts as a stop for an actuating member 80, which is a part of the locking system. The locking system additionally comprises a first locking member 82 and a second locking member 84.

The first locking member 82 is pivotally mounted on the limb 20 of the first member 12 at pivot point 92. The first locking member 82 comprises a plate that defines a recess, or notch, 94 that is shaped and positioned to engage the pin 38. The configuration of the first locking member is such that it is biassed by gravity to positions in which the recess 94 can engage the pin 38. The first locking member 82 includes an arm 96 that projects upwardly towards the front of the cartridge loading device 10. A rear end portion of the actuating member 80 rests on the free end of the arm 96.

The second locking member 84 is pivotally mounted on the limb 20 at pivot point 86. The second locking member 84 consists of a plate-like portion and a cartridge-engaging portion 88 provided at one end of the plate-like portion. The plate-like portion defines a notch, or recess, 90 that is shaped and positioned to engage the pin 36. The cartridge-engaging portion 88 projects at 90° to the plane of the plate-like portion and beyond the limbs 20, 26 so that it lies in the path of any cartridge that is in the process of being inserted into the opening 16. The configuration of the second locking member 84 is such that it is biassed by gravity to rotate to positions in which the recess 90 can engage the pin 36 and the cartridge-engaging portion 88 is in front of and at least partially above the level of the inner surface 56 of the floor 18 of the first member 12.

The pivot points 86, 92 of the first and second locking members 82 and 84 are located in line with the respective lines of movement defined by the slots 30, 32 associated with the locking members.

The actuating arm 80 is pivotally mounted on an ear 98 that projects upwardly of and is integral with the second member 14. The pivot mounting is intermediate the ends of the actuating member 80 at 100. The actuating member 80 comprises a generally planar portion and a projection 102 at its leading end. The projection 102 extends perpendicular to the plane of the actuating member 80 and inwardly of the ear 98 so that it is disposed above the opening 16. The front surface 104 of the projection is a curved cartridge-engaging surface. The actuating member 80 is configured such that it is biassed by gravity to rotate anticlockwise from the position shown in FIG. 5 and is prevented from rotating anticlockwise by the stop surface 78.

Preferably, the limbs 22, 28 on the opposite side of the device 10 are provided with a corresponding, or similar, locking system (not shown).

The operation of the locking system will now be described with particular reference to FIGS. 6 to 8.

Figure 6:
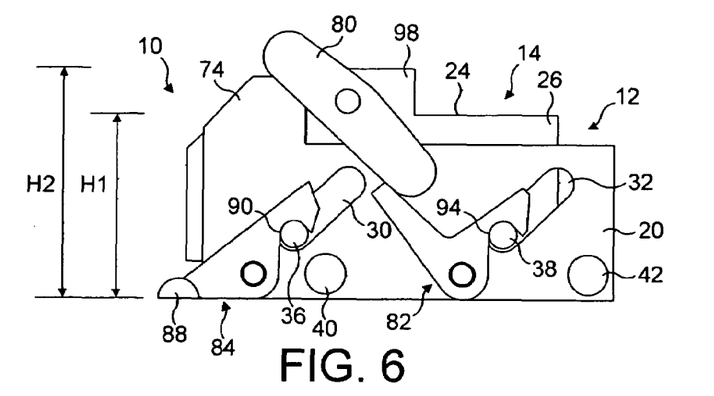
FIG. 6 is a side elevation view of the cartridge loading device as shown in FIG. 5.
Figure 7:
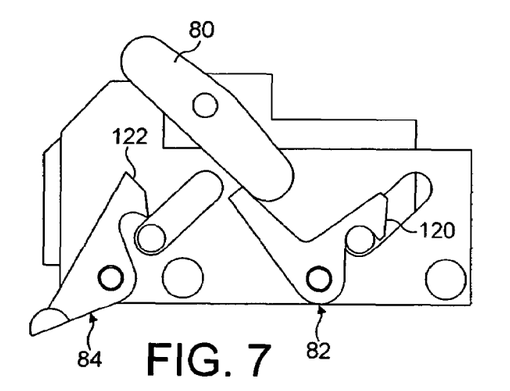
FIG. 7 is a view corresponding to FIG. 6 showing the condition of the locking system after the insertion of a first-sized cartridge (not shown)

FIG. 6 shows the cartridge loading device 10 in the condition in which it is shown in FIG. 5. As shown in FIG. 8, the device 10 is located in a housing, or compartment, having a roof member 110. The housing has an upper door 112 and a lower door 114. A cartridge must be inserted through the doors 112, 114 in order to access the cartridge loading device. As viewed in FIG. 6, the upper door 112 pivots anticlockwise from a closed position to an open position and the lower door 114 pivots clockwise to its open position. The open position of the upper door 112 is defined by a stop 116 that is supported by the roof member 110. Typically the doors 112, 114 are biassed to their respective closed positions by a biassing arrangement (not shown). The biassing arrangement could comprise respective spring members wound around the pivot shafting on which the doors are mounted. However, any suitable known biassing arrangement can be used.

In the condition shown in FIG. 6, the pin 38 is engaged in the recess 94 of the first locking member 82 and the pin 36 is engaged in the recess 90 of the second locking member 84, while the actuating member 80 rests on both the stop surface 78 and the arm 96 of the first locking member 82. In this condition, the pins 36 38 are held at the bottom of the respective slots 30, 32 in such a way that there can be no relative movement between the first and second members 12, 14. In this locked condition, the opening 16 of the cartridge loading device 10 has its first size, with a width W and height H1. A cartridge that is the correct size for the first sized opening and is correctly oriented can be slid past the doors 112, 114 into the opening 16 of the cartridge loading device 10.

As described above, cartridge loading devices are provided with features that interact with the cartridges they are intended to receive to ensure that the cartridges can only be inserted into the device when correctly oriented. At least in part, such features rely on the rigidity of the cartridge loading device in order to function. For example, ramps may be provided adjacent the opening of the cartridge loading device. If the cartridge is inserted in anything except the correct orientation, the ramps drive the cartridge upwardly or downwardly with respect to the opening and due to the rigidity of the cartridge loading device, the cartridge cannot be forced into the opening. If the cartridge is correctly oriented, the ramps do not act on the cartridge, which can, therefore, slide easily into the opening.

The locking system enables the cartridge loading device 10 to be provided with such features for ensuring the correct orientation of cartridges inserted into the opening 16. FIG. 7 shows how the locking system reacts to the insertion of a cartridge that is the correct size for the first-sized opening having a height H1. As the cartridge enters the opening, its underside (or upperside if the cartridge is inserted the wrong way up) pushes the projection 88 of the second locking member 84 downwards causing the locking member 84 to rotate anticlockwise and releasing the pin 36 from its captive state in the recess 90. However, the pin 38 remains firmly engaged in the recess 94 of the first locking member 84 and so cannot slide in its slot 32. As a result, the position of the second member 14 relative to the first member remains fixed. If the cartridge is inserted in the wrong orientation, the ramps will force the cartridge upwards/downwards and because the first locking member 82 remains engaged with the pin 38, the opening 16 will not change size and so the cartridge will not be able to enter the cartridge loading device.

Figure 8:
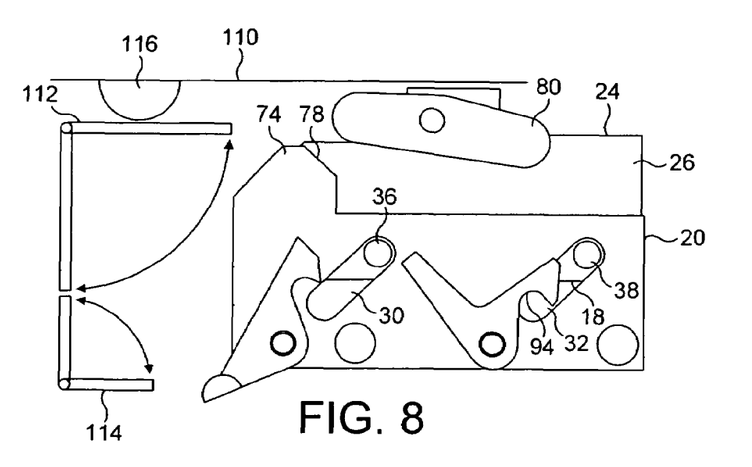
FIG. 8 is a side elevation view of the cartridge loading device showing the condition of the locking system after insertion of a second-sized cartridge (not shown).

FIG. 8 illustrates how the locking system reacts to the insertion of a cartridge that fits into the second sized opening having the height H2. As the cartridge is inserted into the opening 16, it pushes down on the projection 88 of the second locking member 84 causing it to rotate anticlockwise and release the pin 36 from the recess 90. The pin 36 is, thus, free to slide in the slot 30.

Continued insertion of the cartridge results in contact with the curved surface 104 of the projection 102 of the actuating member 80. As the cartridge moves forward, it pushes against the projection 102 causing it to rotate clockwise about its pivot position 100. As the actuating member 80 rotates, it presses down on the arm 96 of the first locking member 82. The downward force acting on the first locking member causes it to rotate anticlockwise and so release the pin 38 from the recess 96. At this stage, both pins 36, 38 are free to slide in their respective slots 30, 32 and the second member 14 is free to move relative to the first member, as described in connection with FIGS. 2 to 4.

Continued insertion of the cartridge forces the second member 14 upwards relative to the first member 12, thus expanding the size of the opening 16 to its maximum height H2, at which the cartridge can be fully inserted into the cartridge loading device 10. Of course, if the cartridge is inserted incorrectly oriented, the features mentioned above will take effect and the cartridge will be forced upwardly or downwardly with respect to the opening 16. Since the maximum height H2 of the opening only just permits insertion of the cartridge and further expansion is prevented by engagement of the pins 36, 38 in the upper ends of the respective slots 30, 32, the incorrectly-oriented cartridge cannot be inserted into the cartridge loading device.

As the second member 14 moves upwardly relative to the first member 12, the projection 102 of the actuating member 80 comes off the top of the cartridge. The gravity bias of the actuating member 80 causes it to rotate anticlockwise. The anticlockwise rotation brings the actuating member 80 back through the position shown in FIG. 6 to an orientation in which the leading end of the actuating member is not as high, relative to its rear end, as when in the FIG. 6 position. The result is that the vertical distance by which the actuating member 80 projects above the second member 14 is reduced to the extent that the ear 98 projects vertically beyond it. This can be seen by comparing the orientation of the actuating member 80 and its position relative to the ear 98 in FIGS. 6 and 8. This provides an important advantage, in that it allows the actuating member to fit under the roof member 110 despite the relative elevation that is a consequence of the upward movement of the second member 14. This is important, because it allows the cartridge loading device 10 to be used in the same size of housing, or compartment as a conventional non-expanding device.

Although not shown in FIG. 8, once the cartridge is fully inserted, the second locking member 84 is able to rotate under the influence of gravity back to the position shown in FIG. 6. Similarly, as the second member 14 moves upwardly to the position shown in FIG. 8, the rear end of the actuating member 80 loses contact with the arm 96 of the first locking member 82, which then rotates under the influence of gravity to the FIG. 6 position.

When a relatively larger cartridge is removed from the cartridge loading device 10, the second member 14, the springs 44, 46 (FIG. 2) pull the second member 14 from the position shown in FIG. 8 to the position shown in FIG. 6. The first and second locking members 82, 84 have respective cam faces 120, 122 that are configured such that as the pins 36, 38 move back down the slots 30, 32, they engage the cam faces and cause the locking members to rotate anticlockwise to permit the pins to return to the lowermost ends of the slots. Once the pins 36, 38 have reached the ends of the slots, the locking members 82, 84 rotate clockwise under the influence of gravity in order to bring the pins 36, 38 into engagement with the respective recesses 90, 94, thereby returning the cartridge loading device to the condition shown in FIG. 6.

It will be appreciated that the locking system allows for the provision of an expandable cartridge loading device that can expand from a first size to a second size and still retain the necessary rigidity to permit the functioning of features that prevent the insertion of incorrectly oriented cartridges. The arrangement of the actuating member 80 and locking member 82, 84 is such that the first and second locking members are progressively released by insertion of a correctly oriented and second sized cartridge into the opening 16. Similarly, the members of the locking system are returned to their locking positions simply by the influence of gravity when the cartridge is removed. Thus, the locking system is actuated by normal insertion and removal of a correctly sized cartridge without the provision of a drive device, which allows the possibility of greater reliability and economic manufacture.

In the embodiment, the locking members 82, 84 are biased by gravity alone to the positions in which they engage the pins 36, 38. That is, the configuration of the locking members 82, 84 and their respective pivot positions 86, 92 is such that without some other external influence, the locking members will tend to rotate to the positions shown in FIG. 5. Similarly, the actuating member 80 is configured and pivotted so that gravity will cause it to rotate to the FIG. 8 position. However, it will be understood that this is not essential. Some, or all, of these parts may be urged to those positions by other means, such as a spring biassing arrangement.

As previously indicated, it is preferred that both sides of the cartridge loading device 10 are provided with a locking system such as is shown in FIGS. 5 to 8. However, it is envisaged that a locking system on just one side may be sufficient.

The locking system as shown has a first and second, or front and rear, locking member and, although that is the presently preferred arrangement, it is envisaged that the front locking member 84 could be dispensed with.

In the embodiments, the projections 88 and 102 are integral parts of the second locking member 82 and the actuating member 80 respectively. This is not essential. One, or both, projections could take the form of rollers mounted on an axle projecting from the respective member.

As shown, the stop surface 78 for the actuating member 80 is defined by a portion of the limb 20. Although this arrangement is to be preferred for simplicity, the stop surface could, instead, be defined by a separate part fixed to the first member 12 or a housing in which the cartridge loading device is housed.

A further factor affecting the design of cartridge loading devices, and in particular the applicant's proposed expanding cartridge loading device, is the so-called form factor. The form factor determines the size of box, or housing, the tape drive can be housed in if it is to be received in the standard sized compartments and openings to be found in computer equipment and the like. If a cartridge loading device that is expandable to receive larger size cartridges is to be widely used, it must be made such that it can fit into the same size compartments and openings as conventional single size cartridge loading devices.

In the embodiment, when the second member 14 has moved to its second position, the actuating member 80 moves to a position in which it is entirely below the uppermost extent of the second member 14, which is the top edge of the ear 98. While this arrangement is preferred, it is not essential. Advantage can be obtained if the actuating member moves, or is moved, to a position in which the vertical distance it projects beyond the second member is reduced as compared with the vertical distance it projects beyond the second member when it is resting on the stop surface 78 and/or acting on the first locking member 82. It will also be appreciated that it is the vertical projection distance that is important in order to obtain the advantage. This does not preclude the possibility of the actuating member projecting beyond the first and/or second members 12, 14 in the horizontal direction, should this be desirable.

In referring to the height H1, H2 of the first and second sized openings, it is to be understood that this does not have to be uniform across the width of the opening. The height is the distance between a portion of the first member and an opposed portion of the second member that controls whether a cartridge which the opening is intended to receive can actually be received. The height might be the spacing between two plane surfaces as shown in FIG. 2. However, as an example of an alternative arrangement, the roof portion 24 might be provided with one or more projections facing the floor portion 18 and it would be the distance between the projection, or projections, and the floor portion that would represent the height and determine the height of cartridge that could be received in the opening.

As an alternative to the ramps described above, it will be understood that the first member 12 and second member 14 can be provided with ribs or grooves configured to mate with ribs or grooves on a cartridge that are arranged to ensure that the cartridge is inserted in the correct orientation. For example, a rib, or projection, might be provided on the floor portion 18 to one side of the centreline of the opening 18. This would be positioned such that provided the cartridges the opening is intended to receive are correctly oriented when inserted into the opening, the rib will be received in a groove, or recess, in the cartridge. As is known, such an arrangement can ensure that cartridges can only be inserted into the opening when correctly oriented. As with the system of ramps described above, it will be appreciated that when a cartridge that is the correct size for the first size opening is inserted into the cartridge loading device in an incorrect orientation, the first locking member 82 will continue to engage the pin 38, so preventing movement of the second member 14 relative to the first member 12. Thus, the second member 14 cannot be forced upwardly in such a way as to override the function of the rib/groove arrangement.

The alignment of the pivot centres 86, 92 with the respective lines of movement defined by the elongate slots 30, 32 provides a useful advantage in making the device less sensitive to the tolerances that must be present in the manufacture of assemblies with moving parts. With an expandable cartridge loading device as described, tolerance stack up is an important factor to be taken into account. If the pivot centres of the locking system are in line with the respective lines of movement of the guide tracks, the tolerances are at a minimum.

In the embodiment, the guide tracks are defined by straight-line slots so that movement of the second member is along a straight line. Alternatively, the guide tracks could be defined by recesses in which the projections would be received. In that case, the projections would preferably be considerably shorter than the illustrated projections. As yet another alternative, the recesses, or slots, may be arcuate instead of straight line. In that case, the pivot points should be on a line that is tangential to a portion of the recesses or slots that controls the initial movement of the second member when it moves from its first position, shown in FIG. 3.

As an alternative to slots or recesses defining a guide track, a parallel linkage may be used with the line of movement defined by the parallel arms of a parallel linkage. In this case, the projection engaged by the rotatable locking member will have an arcuate line of movement. One, or a lower, end of the arcuate line will define the position of the second member 14 as shown in FIG. 6 and the other, or upper, end of the arcuate line will define the position of the second member as shown in FIG. 8. The rotatable locking member should have its pivot point located on a line that is tangential to a first portion of the line of movement of the projection, which first portion extends from the lower end of the arcuate line of movement. It will be appreciated that more than one projection may be provided on the parallel linkage, with a respective rotatable locking member for each projection. In that case, the respective pivot axis of the locking members should be located on lines that are tangential to the first portion of the respective arcuate movement lines.

The invention claimed is:

1. A cartridge loading device for magnetic tapes comprising housing means defining a housing for magnetic tape cartridges that can expand from a first size to a second size, guide means for controlling expansion of said housing from said first size to said second size and comprising at least one means defining a line of movement having a first end associated with said first size of said housing and a second end associated with said second size of housing, and a rotatable locking means for locking said housing means in a locked condition in which said housing is said first size, said first size having a first height and said second size having a second height, said second height being greater than said first height, said sizes of said housing being selected such that when said housing is said first size, it can receive first sized magnetic tape cartridges having a predetermined height and when said housing is said second size, it can receive second sized magnetic tape cartridges having a predetermined height that is greater than the height of said first sized magnetic tape cartridges, and said locking means being actuable by insertion of a second sized cartridge into said housing to release said housing means from said locked condition to permit expansion of said housing from said first size to said second size and having an axis of rotation located on a line that is in line with at least a first portion of a line of movement defined by said at least one means defining a line of movement, which first portion extends from said first end of the line of movement.

2. A device as claimed in claim 1, wherein said line of movement defines a line of movement that is a straight line.

3. A device as claimed in claim 1, wherein said line of movement is arcuate and said axis of rotation is located on a line that is tangent to said first portion of the line of movement.

4. A device as claimed in claim 1, wherein said housing means comprises a first housing portion and a second housing portion, relative movement between said first and second housing portions provides said expansion from said first size to said second size and said at least one means defining a line of movement comprises a guide track carried by said first housing portion.

5. A device as claimed in claim 4, wherein the guide track defined by said at least one means defining a line of movement is a slot provided in said first housing portion.

6. A device as claimed in claim 4, wherein said guide means further comprises a projection engaged in the guide track and carried by said second housing portion.

7. A device as claimed in claim 6, wherein said rotatable locking means is engageable with the said projection to lock said housing means in said locked condition.

8. A device as claimed in claim 6, comprising a plurality of said means defining a line of movement and respective projections engaged in the guide tracks they define and further comprising a respective said rotatable locking means engageable with each projection to lock said housing means in said locked condition, each said rotatable locking means having an axis of rotation and said axes of rotation each being on a line that is in line with at least a portion of the line of movement defined by the respective guide track.

9. A digital data transfer apparatus comprising a cartridge loading device for magnetic tape cartridges as claimed in claim 1.

10. A cartridge loading device for magnetic tape cartridges, said device comprising a first member, a second member movable relative to said first member from a first position to a second position, a guide arrangement for guiding movement of said second member between said first and second positions and comprising a projection received in an elongate guide track defining a line of movement for said projection having a first end defining said first position and a second end defining said second position, and a locking system comprising a pivotable locking member engageable with said projection for locking said second member in said first position, said first and second members cooperating when in said first position to define a first sized opening having a height sized to receive first sized magnetic tape cartridges having a predetermined height and, when in said second position, cooperating to define a second sized opening having a height that is greater than the height of said first sized opening, said second sized opening being sized to receive second sized magnetic tape cartridges having a predetermined height that is greater than the height of said first sized magnetic tape cartridges, said locking member being actuable by insertion of a second sized cartridge into said first sized opening to release said projection to permit movement of said second member from said first position to said second position, and said pivotable locking member having a pivot point disposed on a line that is in line with at least a first portion of said line of movement, which first portion extends from said first end.

11. A device as claimed in claim 10, wherein said line of movement is arcuate and said pivot point is disposed on a line that is tangent to said first portion.

12. A device as claimed in claim 10, wherein said line of movement is a straight line.

13. A device as claimed in claim 10, wherein said locking system further comprises an actuating member for receiving a force transmitted by said insertion of a second sized cartridge into said first sized opening and applying said force to said locking member to cause said locking member to pivot to a release position so as to provide said release of said projection.

14. A device as claimed in claim 10, wherein said guide arrangement comprises a plurality of said projections engaged in respective said elongate guide tracks and respective said pivotable locking members engageable with said projections, each locking member having a pivot point disposed on a line that is in line with at least said first portion of the line of movement defined by the respective guide track.

15. A device as claimed in claim 14, comprising at least one locking member carrying a part that extends across said first sized opening so as to be contactable by first and second sized magnetic tape cartridges inserted into said first sized opening whereby a force is applied to the locking member to move the locking member to a release position.

16. A device as claimed in claim 14, comprising two said pivotable locking members having respective actuating members associated therewith, each said actuating member being arranged to receive a force transmitted by said insertion of a second sized cartridge into said first sized opening and apply said force to the respective locking member to cause the locking member to pivot to a release position so as to provide said release of the projections.

17. A device as claimed in claim 14, wherein each said locking member is biased to engage the respective said projection.

18. A device as claimed in claim 17, wherein at least one said locking member is biassed by gravity to engage the respective projection.

* * * * *